(12) United States Patent
Ohnishi et al.

(10) Patent No.: US 9,890,840 B2
(45) Date of Patent: *Feb. 13, 2018

(54) ELECTRIC LINEAR ACTUATOR

(71) Applicant: NTN Corporation, Osaka-shi (JP)

(72) Inventors: Takaaki Ohnishi, Wako (JP);
Kunimichi Hatano, Wako (JP);
Keisuke Kazuno, Iwati (JP); Hirakazu Yoshida, Iwata (JP)

(73) Assignee: NTN Corporation, Osaka-shi (JP)

( * ) Notice: Subject to any disclaimer, the term of this patent is extended or adjusted under 35 U.S.C. 154(b) by 298 days.

This patent is subject to a terminal disclaimer.

(21) Appl. No.: 14/683,275

(22) Filed: Apr. 10, 2015

(65) Prior Publication Data

US 2015/0285347 A1    Oct. 8, 2015

Related U.S. Application Data

(63) Continuation of application No. PCT/JP2013/077741, filed on Oct. 11, 2013.

(30) Foreign Application Priority Data

Oct. 12, 2012 (JP) .................................. 2012-227497

(51) Int. Cl.
*F16H 25/22* (2006.01)
*F16H 25/24* (2006.01)
*H02K 7/06* (2006.01)
*F16H 25/20* (2006.01)

(52) U.S. Cl.
CPC ......... *F16H 25/2204* (2013.01); *F16H 25/24* (2013.01); *H02K 7/06* (2013.01); *F16H 2025/204* (2013.01); *F16H 2025/2031* (2013.01); *F16H 2025/2081* (2013.01); *F16H 2025/2445* (2013.01); *Y10T 74/1868* (2015.01)

(58) Field of Classification Search
CPC ................................................ F16H 2025/204
See application file for complete search history.

(56) References Cited

U.S. PATENT DOCUMENTS 2,464,873 A * 3/1949 Lear ..................... B64C 13/30
74/606 R
9,476,489 B2 * 10/2016 Funada ............... F16H 25/2204
(Continued)

FOREIGN PATENT DOCUMENTS

| CN | 101437712 | 5/2009 |
|---|---|---|
| JP | 63-9547 | 1/1988 |
| JP | 9-144831 | 6/1997 |

(Continued)

*Primary Examiner* — Terence Boes
(74) *Attorney, Agent, or Firm* — Harness, Dickey & Pierce, P.L.C.

(57) ABSTRACT

An electric linear actuator has a housing, an electric motor, a speed reduction mechanism and a ball screw mechanism. The ball screw mechanism has a nut and screw shaft. A blind bore is formed on the housing. The blind bore contains an end of the screw shaft. An anti-rotation mechanism for the screw shaft has a sleeve and guide pin. The sleeve is press-formed from steel sheet and fit into the blind bore of the housing. The guide pin is mounted on the end of the screw shaft, via a through aperture formed in the screw shaft. The guide pin axially movably engages the sleeve.

12 Claims, 6 Drawing Sheets

(56) References Cited

U.S. PATENT DOCUMENTS

2012/0247240 A1   10/2012  Kawahara et al.
2013/0133448 A1*  5/2013  Schroeder ........... F16H 25/2006
                                                            74/89.32

FOREIGN PATENT DOCUMENTS

| JP | 2002-206559 | 7/2002 | | |
|----|----|----|----|----|
| JP | 2005-299726 | 10/2005 | | |
| JP | 2007-333046 | 12/2007 | | |
| JP | 2010-270887 | 12/2010 | | |
| JP | 2012-082921 | 4/2012 | | |
| JP | 2014088919 A | * | 5/2014 | ......... F16H 25/2204 |

* cited by examiner

[Fig 1]
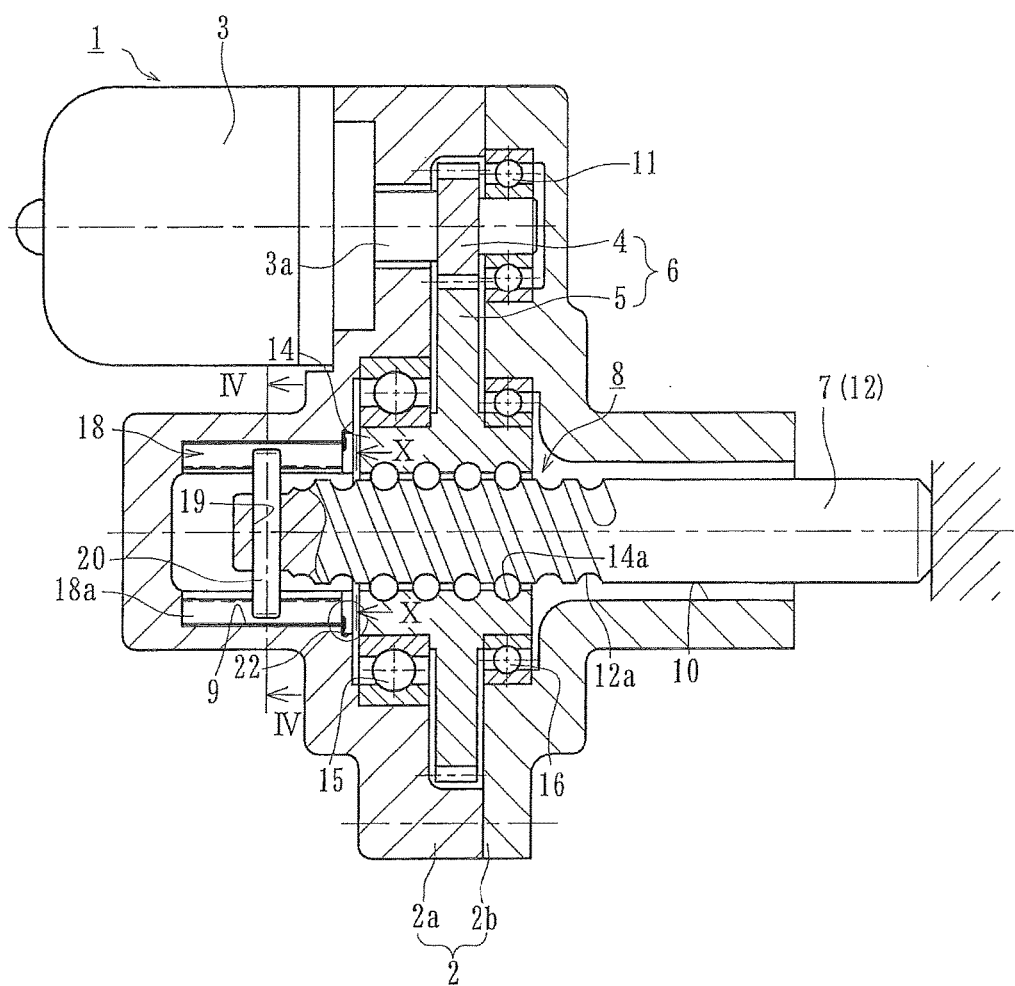

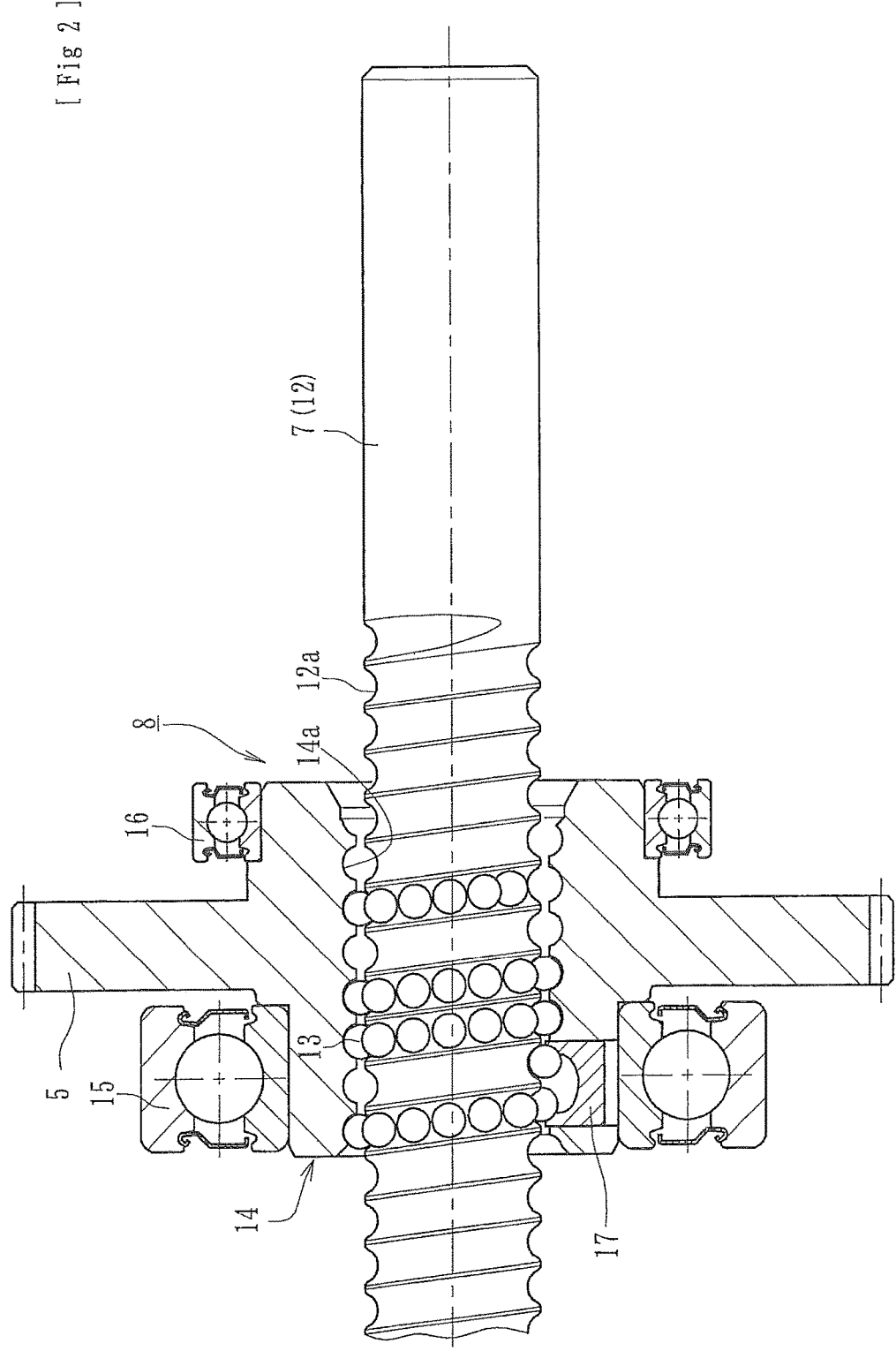

[Fig 3]
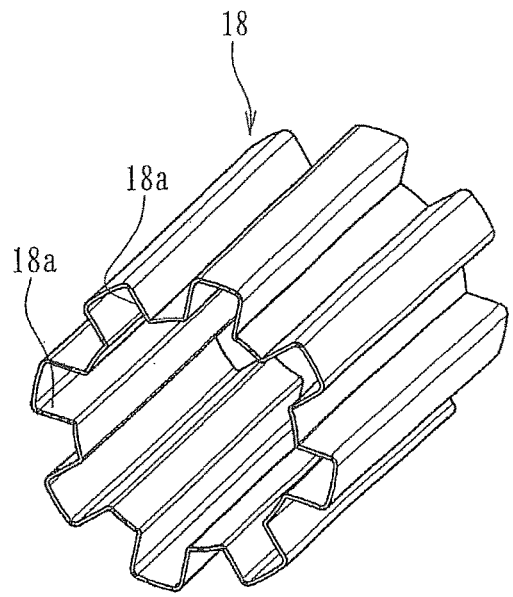
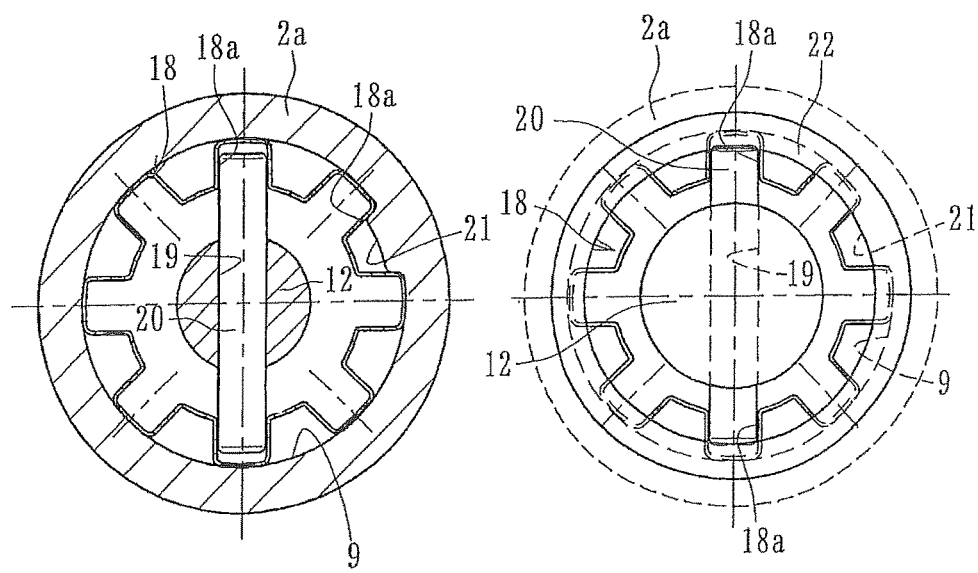
[Fig 4](a)    [Fig 4](b)

[Fig 5]
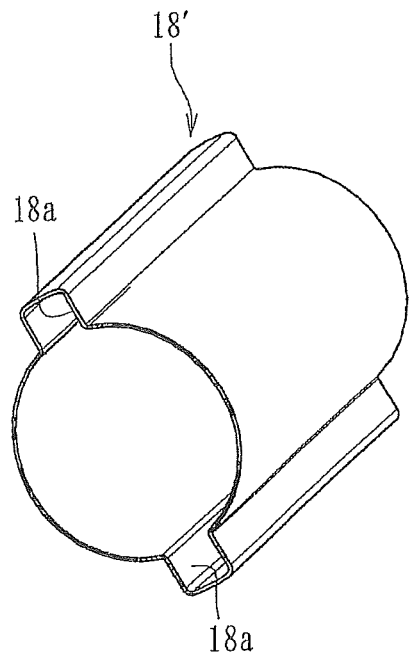
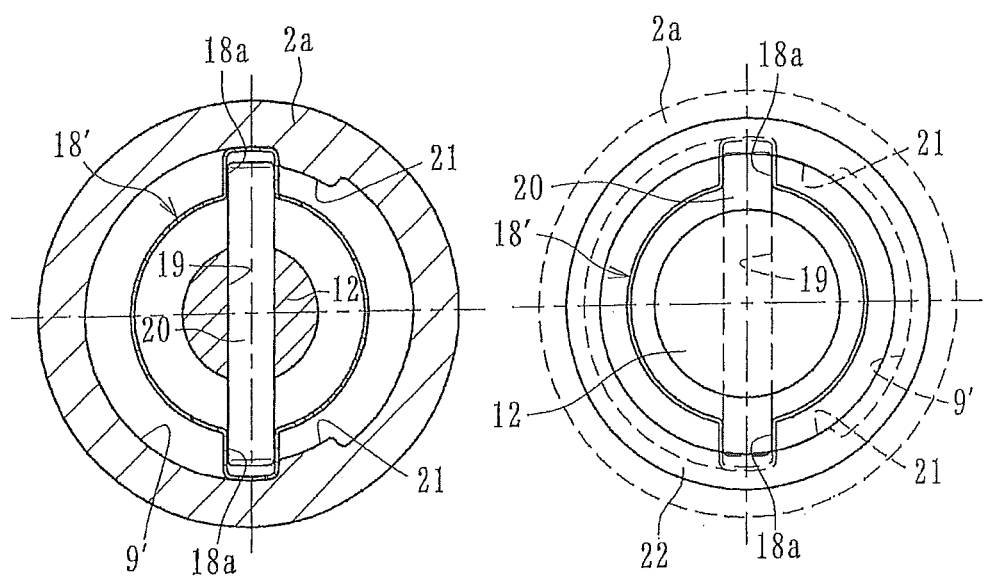
[Fig 6](a)  [Fig 6](b)

[Fig 7]
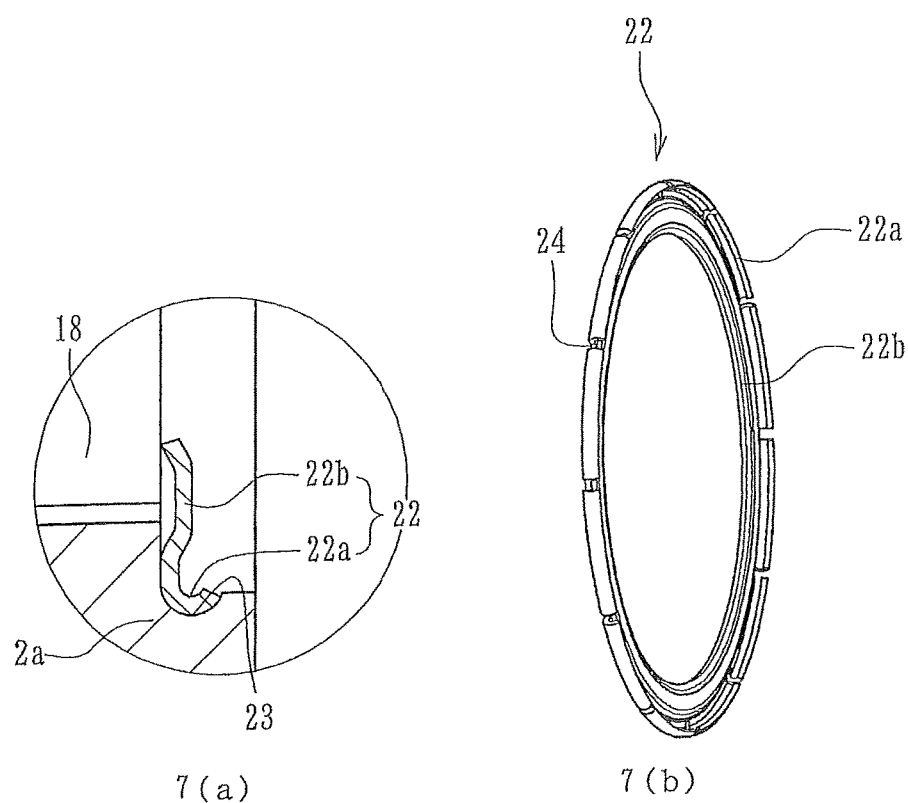
7(a)　　　　　7(b)

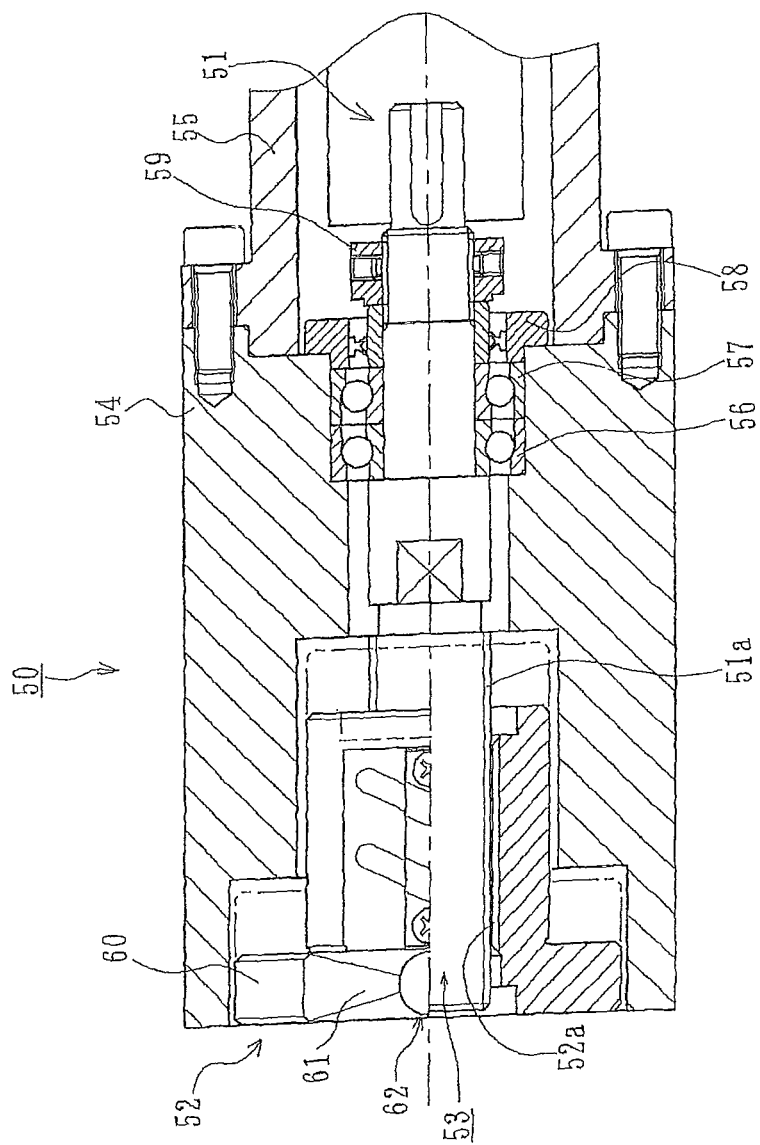
[Fig 8] PRIOR ART

ELECTRIC LINEAR ACTUATOR

CROSS-REFERENCE TO RELATED APPLICATIONS

This application is a continuation of International Application No. PCT/JP2013/077741, filed Oct. 11, 2013, which claims priority to Japanese Application No. 2012-227497, filed Oct. 12, 2012. The disclosures of the above applications are incorporating herein by reference.

FIELD

The present disclosure relates to an electric actuator with a ball screw mechanism used in motors in general industries and driving sections of automobiles, etc. More particularly, it relates to an electric linear actuator used in automotive transmissions or parking brakes to convert rotary motion, from an electric motor, to linear motion of a drive shaft, via the ball screw mechanism.

BACKGROUND

Generally gear mechanisms such as a trapezoidal thread worm gear mechanism or a rack and pinion gear mechanism have been used as a mechanism to convert a rotary motion of an electric motor to an axial linear motion in an electric linear actuator in various kinds of driving sections. These motion converting mechanisms involve sliding contact portions. Thus, power loss is increased. Accordingly, size of electric motor and power consumption are increased. Thus, the ball screw mechanisms have been widely adopted as more efficient actuators.

In prior art electric linear actuators, an output member, connected to a nut, can be axially displaced by rotationally driving a ball screw shaft. This forms a ball screw with use of an electric motor supported on a housing. Generally, friction of the ball screw mechanism is very low. Thus, the ball screw shaft tends to be easily reversely rotated when a pushing thrust load is applied to the output member. Accordingly, it is necessary to hold the position of the output member when the electric motor is stopped.

Accordingly, an electric linear actuator has been developed with a brake for the electric motor or a low efficient mechanism, such as a worm gear, is provided as a power transmitting mechanism. In FIG. 8, one representative example is shown. This electric linear actuator 50 has a ball screw mechanism 53 with a ball screw shaft 51 rotationally driven by an electric motor (not shown). A cylindrical ball screw nut 52 is threadably engaged with the ball screw shaft 51, via balls (not shown). Rotation of a motor shaft (not shown) of the electric motor causes rotation of the ball screw shaft 51 connected to the motor shaft. This further causes a linear motion (motion in left-right directions in FIG. 8) of the ball screw nut 52.

The ball screw shaft 51 is rotationally supported on cylindrical housings 54, 55 via two rolling bearings 56, 57. These bearings 56, 57 are secured in position by an anti-rotation member 59 to prevent loosening of the bearings 56, 57 via a securing cover 58.

A helical screw groove 51a is formed on the outer circumference of the ball screw shaft 51. The ball screw nut 52 is threadably engaged with the shaft 51, via balls. A helical screw groove 52a, corresponding to the helical screw groove 51a of the ball screw shaft 51, is formed on the inner circumference of the ball screw nut 52. A large diameter portion 60 is also formed on one end of the nut 52.

A flat portion 61 is formed on the side of the large diameter portion 60 by cutting. It has a flat end face and a cam follower 62 or anti-rotation mechanism for the ball screw nut 52. A rolling bearing projects radially outward from a substantially central portion of the flat portion 61.

As described above, since the cam follower 62 is fit in the cut-out portion, accompanying rotation of the ball screw nut 52 to the rotation of the ball screw shaft 51 can be prevented. Thus, the cam follower 62 rotationally slides on the cut-out portion. Problems of sliding friction as well as wear can be reduced. See, JP2007-333046 A In the prior art electric linear actuator 50, it adopts the cam follower 62 as the anti-rotation mechanism for the ball screw nut 52. Thus, it is possible to reduce problems of sliding friction as well as wear. This reduces operating torque of the electric linear actuator 50. However, the cam follower 62 itself uses the rolling bearing. This increases manufacturing cost and any anti-wear measures when the housing 54 is formed from aluminum.

SUMMARY

It is, therefore, an object of the present disclosure to provide an electric linear actuator with an anti-rotation mechanism for the screw shaft that provides a simple structure. Thus, a low manufacturing cost and reduced sliding friction and wear is achieved.

The present disclosure provides an electric linear actuator comprising a cylindrical housing, an electric motor mounted on the housing, a speed reduction mechanism, reducing rotational speed of the electric motor via a motor shaft, and a ball screw mechanism. The ball screw mechanism converts rotational motion of the electric motor, transmitted via the speed reduction mechanism, to axial linear motion of a drive shaft. The ball screw mechanism comprises a nut and a screw shaft. The nut is formed with a helical screw groove on its inner circumference. The nut is supported by bearings rotationally mounted on the housing but is axially immovable with respect to the housing. The screw shaft is coaxially integrated with the drive shaft. The screw shaft is formed with a helical screw groove on its outer circumference corresponding to the helical screw groove of the nut. The screw shaft is inserted into the nut, via a large number of balls. The screw shaft is axially movably supported on the housing, but is not rotatable with respect to the housing. A blind bore is formed on the housing to contain an end of the screw shaft. The electric linear actuator further comprises an anti-rotation mechanism on the screw shaft. The anti-rotation mechanism includes a sleeve and a guide pin. The sleeve is press-formed from a steel sheet and fit in the blind bore of the housing. The guide pin is mounted on the end of the screw shaft, via a through aperture in the screw shaft. The guide pin axially movably engages the sleeve, but is not rotatable with respect to the sleeve.

A speed reduction mechanism reduces rotational speed of the electric motor, via a motor shaft. A ball screw mechanism converts rotational motion of the electric motor, transmitted via the speed reduction mechanism, to axial linear motion of a drive shaft. The ball screw mechanism comprises a nut and a screw shaft. The nut is formed with a helical screw groove on its inner circumference. The nut is supported by bearings rotationally mounted on the housing but is axially immovable with respect to the housing. The screw shaft is coaxially integrated with the drive shaft. The screw shaft is formed with a helical screw groove on its outer circumference corresponding to the helical screw groove of the nut. The screw shaft is inserted into the nut, via a large number of balls. The screw shaft is axially movably supported on the housing but is not rotatable with respect to the housing. A blind bore is formed on the housing to contain an end of the screw shaft. The electric linear actuator further comprises an anti-rotation mechanism for the screw shaft. The anti-rotation mechanism comprises a sleeve and a guide pin. The sleeve is press-formed from steel sheet and fit into the blind bore of the housing. The guide pin is mounted on the end of the screw shaft, via a through aperture in the screw shaft. The guide pin axially movably engages the sleeve but is not rotatable with respect to the sleeve. Thus, it is possible to provide an electric linear actuator with the anti-rotation mechanism for the screw shaft of simple construction and low manufacturing cost.

Protruding ridges are formed on the inner circumference of the blind bore of the housing. The sleeve, of the anti-rotation mechanism, engages the protruding ridges. This makes it possible to prevent rotation of sleeve relative to the housing without press-fitting of the sleeve into the blind bore of the housing. Thus, this improves the assembly operation of the electric linear actuator.

The sleeve is formed with axially extending recessed grooves arranged equidistantly along its periphery in a petaloid fashion, in cross-section. This simplifies the assembly operation while reducing troublesome engagement of the guide pin with the recessed grooves.

The sleeve is formed from stainless steel sheet or formed of cold rolled steel sheet. Surfaces of the sleeve are liquid phase plated.

An outer end of the blind aperture is formed with an annular groove. A holding ring is snap-fit into the groove so that it abuts against one end of the sleeve to hold it in the blind aperture. This makes it possible to firmly secure the sleeve in an axial direction by a simple means.

The holding ring is press-formed from steel sheet. The holding ring comprises a securing portion and a flattened portion. The securing portion has a circular configuration and is adapted to be snap-fit into the annular groove. The flattened portion extends radially inward from the securing portion. The flattened portion is adapted to abut against an end of the sleeve. The securing portion is formed with slits equidistantly arranged along the circumference of the securing portion. This makes it possible to easily mount the holding ring on the housing. Also, it improves the assembly operation of the electric linear actuator.

The holding ring is formed of ZAM steel sheet. This improves the anticorrosion property with low cost.

The through aperture is formed with a predetermined hardened layer by high frequency induction hardening. This improves the anti-wear property of the through aperture. Thus, the aperture stably supports the guide pin for a long term.

The outer peripheral faces of the guide pin are crowned. This improves the durability of the guide pin while reducing the contacting surface pressure by eliminating the edge load that would be caused between the through aperture and the guide pin.

Finally, the housing is formed from aluminum alloy. This reduces the weight of the electric linear actuator. It should be noted that aluminum shortcomings of weakness in material strength and anti-wear property can be solved by the sleeve having higher material strength and anti-wear property than those of the aluminum according to the present disclosure.

The electric linear actuator comprises a cylindrical housing, an electric motor mounted on the housing, a speed reduction mechanism to reduce rotational speed of the electric motor, via a motor shaft, and a ball screw mechanism. The ball screw mechanism converts rotational motion of the electric motor, transmitted via the speed reduction mechanism, to axial linear motion of a drive shaft. The ball screw mechanism comprises a nut and a screw shaft. The nut is formed with a helical screw groove on its inner circumference. The nut is rotationally supported by bearings mounted on the housing but is axially immovable with respect to the housing. The screw shaft is coaxially integrated with the drive shaft. The screw shaft is formed with a helical screw groove on its outer circumference corresponding to the helical screw groove of the nut. The screw shaft is inserted into the nut, via a large number of balls. The screw shaft is axially movably supported on the housing but is not rotatable with respect to the housing. A blind bore is formed on the housing to contain an end of the screw shaft. The electric linear actuator further comprises an anti-rotation mechanism on the screw shaft. It includes a sleeve and a guide pin. The sleeve is press-formed from steel sheet and fit into the blind bore of the housing. The guide pin is mounted on the end of the screw shaft, via a through aperture formed in the screw shaft. The guide pin axially movably engages the sleeve but it is not rotatable with respect to the sleeve. Thus, it is possible to provide an electric linear actuator with the anti-rotation mechanism for the screw shaft of simple construction and low manufacturing cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a preferable embodiment of an electric linear actuator.

FIG. 2 is a longitudinal section view of a ball screw mechanism of FIG. 1.

FIG. 3 is a perspective view of a single body of a sleeve.

FIG. 4(a) is a cross-sectional view taken along a line IV-IV of FIG. 1.

FIG. 4(b) is a cross-sectional view taken from a direction of line X-X of FIG. 1.

FIG. 5 is a perspective view of a modification of the sleeve of FIG. 3.

FIG. 6(a) is a cross-sectional view similar to FIG. 4(a).

FIG. 6(b) is a cross-sectional view taken similarly to FIG. 4(b).

FIG. 7(a) is a partially enlarged view of a holding ring for the sleeve.

FIG. 7(b) is a perspective view of a single body of the holding ring of FIG. 7(a).

FIG. 8 is a longitudinal section view of a prior art electric linear actuator.

DETAILED DESCRIPTION

An electric linear actuator includes a cylindrical housing, an electric motor mounted on the housing, a speed reduction mechanism to reduce rotational speed of the electric motor, via a motor shaft, and a ball screw mechanism. The ball screw mechanism converts rotational motion of the electric motor, transmitted via the speed reduction mechanism, to axial linear motion of a drive shaft. The ball screw mechanism includes a nut and a screw shaft. The nut is formed with a helical screw groove on its inner circumference. The nut is rotationally supported by bearings mounted on the housing but it is axially immovable with respect to the housing. The screw shaft coaxially is integrated with the drive shaft. The screw shaft is formed with helical screw groove on its outer circumference corresponding to the helical screw groove of the nut. The screw shaft is inserted into the nut, via a large number of balls. The screw shaft is axially movably supported on the housing but it is not rotatable with respect to the housing. A blind bore is formed on the housing to contain an end of the screw shaft. Protruding ridges are formed on the inner circumference of the blind bore of the housing. A sleeve is fit in the blind bore. The sleeve is press-formed from cold rolled steel sheet that is liquid phase plated. The sleeve is formed with axially extending recessed grooves arranged equidistantly along its periphery in a petaloid fashion in cross-section. A radially extending through aperture is formed in one end of the screw shaft. A guide pin is inserted in the through aperture and engages in the recessed grooves.

A preferred embodiment of the present disclosure will be hereinafter described with reference to the drawings.

FIG. 1 is a longitudinal section view of a preferable embodiment of an electric linear actuator. FIG. 2 is a longitudinal section view of a ball screw mechanism of FIG. 1. FIG. 3 is a perspective view of a single body of sleeve. FIG. 4(a) is a cross-sectional view taken along a line IV-IV in FIG. 1. FIG. 4(b) is a cross-sectional view taken from a direction of line X-X in FIG. 1. FIG. 5 is a perspective view of a modification of a sleeve of FIG. 3. FIG. 6(a) is a cross-sectional view similar to FIG. 4(a). FIG. 6(b) is a cross-sectional view taken similarly to FIG. 4(b). FIG. 7 (a) is a partially enlarged view of a holding ring for the sleeve. FIG. 7(b) is a perspective view of a single body of the holding ring of FIG. 7(a).

As shown in FIG. 1, an electric linear actuator 1 includes a cylindrical housing 2, an electric motor 3 mounted on the housing 2, a speed reduction mechanism 6 and a ball screw mechanism 8. The speed reduction mechanism 6 includes a pair of spur gears 4, 5 to reduce rotational speed of the electric motor 3, via a motor shaft 3a. The ball screw mechanism 8 converts rotational motion of the electric motor 3, transmitted via the speed reduction mechanism 6, to axial linear motion of a drive shaft 7.

The housing 2 is formed of aluminum alloy such as A 6063 TE, ADC 12 etc. It includes a first housing 2a and a second housing 2b abutted with and integrally fastened to each other by fastening bolts (not shown). The electric motor 3 is mounted on the first housing 2a. Blind bores 9, 10, containing a screw shaft 12, are formed in the first and second housings 2a, 2b, respectively.

The smaller spur gear (pinion gear) 4 is immovably press-fit onto the motor shaft 3a of the electric motor 3. The motor shaft 3a is rotationally supported by a rolling bearing 11 mounted on the second housing 2b. The larger spur gear 5 is formed integrally with a nut 14 forming the ball screw mechanism 8, described later in more detail. The larger spur gear 5 mates with the smaller spur gear 4. The drive shaft 7 is formed integrally with a screw shaft 12 forming the ball screw mechanism 8.

As shown in an enlarged view of FIG. 2, the ball screw mechanism 8 includes the screw shaft 12 and the nut 14. The nut 14 threadably engages the screw shaft 12, via balls 13. The screw shaft 12 is formed with a helical screw groove 12a on its outer circumference. The screw shaft 12 is axially movably supported but is not rotational. On the other hand, the nut 14 is formed on its inner circumference with a helical screw groove 14a corresponding to the helical screw groove 12a of the screw shaft 12. A number of balls 13 are rollably accommodated between these screw grooves 12a, 14a. The nut 14 is rotationally supported on the first and second housings 2a, 2b via two bearings 15, 16. The nut is axially immovable relative to the housings 2a, 2b. A numeral 17 denotes a bridge member for achieving an endless circulating passage of balls 13 through the screw groove 14a of the nut 14.

The cross-sectional configuration of each screw groove 12a, 14a may be either one of circular-arc or Gothic-arc configuration. However, this embodiment adopts the Gothic-arc configuration since it can have a large contacting angle with the ball 13 and a small axial gap. This enables a large rigidity against the axial load and thus suppresses the generation of vibration.

The nut 14 is formed of case hardened steel such as SCM 415 or SCM 420. Its surface is hardened to HRC 55~62 by vacuum carburizing hardening. This enables the nuts 14 to omit treatments such as buffing for scale removal after heat treatment. Thus, this reduces the manufacturing cost. On the other hand, the screw shaft 12 is formed of medium carbon steel such as S 55C or case hardened steel such as SCM 415 or SCM 420. Its surface is hardened to HRC 55~62 by induction hardening or carburizing hardening.

The larger gear 5 forming the reduction mechanism 6 is integrally secured on the outer circumference of the nut 14. Two supporting bearings 15, 16 are press-fit onto either side of the larger gear 5, via a predetermined interface. This makes it possible to prevent the generation of axial positional displacement between the supporting bearings 15, 16 and the larger gear 5 even though a thrust load would be applied to them from the drive shaft 7. In addition, each of the supporting bearings 15, 16 is formed as a deep groove ball bearing of the sealed type where shield plates are arranged on either side of the support bearing. The plates prevent leakage of grease contained in the bearings and the penetration of worn powder or debris into the bearings from outside.

The electric linear actuator 1 is provided with an anti-rotation mechanism for the screw shaft 12. The anti-rotation mechanism includes a cylindrical sleeve 18 and a guide pin 20, as shown in FIG. 1. The sleeve 18 is press-formed from cold rolled steel sheet (e.g. JIS SPCC family) with axially extending recessed grooves 18a. The grooves 18a are arranged equidistantly along the sleeve periphery in a petaloid fashion in cross-section. The sleeve 18 has higher material strength and anti-wear property than those of the first housing 2a, of aluminum alloy. This increases the durability of the electric linear actuator 1. The arrangement of recessed grooves 18a, equidistantly along the sleeve periphery in a petaloid fashion, simplifies assembly of the guide pin 20 into the sleeve. The sleeve 18 may be formed of materials other than that previously described, examples are austenitic stainless steel sheet (e.g. JIS SUS 304 family) or ferritic stainless steel sheet (e.g. JIS SUS 430 family), cold rolled steel sheet having liquid phase plating such as electric plating or electroless nickel plating, or high anticorrosive molten plating steel sheet (called as ZAM steel sheet).

As can be seen in FIGS. 4(a) and 4(b), the sleeve 18 is press-fit into the blind bore 9 of the first housing 2a. It is prevented from rotating relative to the first housing 2a by protruding ridges 21. The ridges 21 are formed on the inner circumference of the blind bore 9. On the other hand, the guide pin 20 is mounted on the end of the screw shaft 12 via a through aperture 19 diametrically formed in the screw shaft. The through aperture 19 is hardened by high frequency hardening to have a surface hardness of HRC 60~64.

It is preferable to use a needle roller from a needle roller bearing as the guide pin 20. The needle roller is easily available and has high anti-wear property and shearing strength. In particularly, the outer peripheral faces of each needle roller are crowned. This improves the durability of the needle roller (i.e. guide pin 20) by reducing the contacting surface pressure by eliminating the edge load that would be caused between the through aperture 19 and the guide pin 20.

The guide pin 20, engaging the recessed grooves 18a, is inserted in the through aperture 19. The guide pin 20 can rotate in the through aperture 19. Thus, it is possible to provide the electric linear actuator 1 with an anti-rotation mechanism for the screw shaft 12 that can reduce the sliding friction and wear of the housing 2a and be manufactured at a low cost with a simple construction. In addition, the through aperture 19 is hardened to have a hardened layer with a surface hardness of HRC 60~64 by high frequency induction hardening. Thus, this improves the anti-wear property of the through aperture 19 and stably supports the guide pin 20 for a long term.

FIG. 5 shows a modified sleeve 18' of the sleeve 18. This sleeve 18' is press-formed of cold rolled steel sheet and formed with axially extending recessed grooves 18a arranged opposite to each other. Similar to the sleeve 18, this sleeve 18' has higher material strength and anti-wear property than those of the aluminum first housing 2a. Thus, this improves the durability and further reduces the manufacturing cost due to its simple configuration.

As can be seen in FIGS. 6(a) and 6(b), the sleeve 18' is press-fit into the blind bore 9' of the first housing 2a. This prevents rotation relative to the first housing 2a by protruded ridges 21 formed on the inner circumference of the blind bore 9'. On the other hand, the guide pin 20 is mounted on the end of the screw shaft 12 via a through aperture 19 diametrically formed in the screw shaft. The guide pin 20 performs axial guide and anti-rotation functions of the screw shaft 12 relative to the first housing 2a. As described above, it will be appreciated that the sleeve 18' secured on the first housing 2a and the guide pin 20, engaging the recessed grooves 18a, cooperate and constitute the anti-rotation mechanism for the screw shaft 12.

Also in this modification, the guide pin 20 is inserted in the through aperture 19 so that the guide pin 20 can rotate in the through aperture 19. Thus, this provides the electric linear actuator 1 with an anti-rotation mechanism for the screw shaft 12 that reduces sliding friction and wear on the housing 2a and can be manufactured at a low cost with a simple construction.

Finally as shown in FIGS. 7(a) and 7(b), the sleeve 18 (18') can be axially secured by a holding ring 22 that is snap-fit in an annular groove (23) formed in the end of the blind bore 9.

The holding ring 22 is press-formed from cold rolled steel sheet made with preservative characteristics by zinc plating. A securing portion 22a has a circular configuration and is adapted to be snap-fit into the annular groove 23. A flattened portion 22b extends radially inward from the securing portion 22a. The flattened portion 22b is adapted to abut against an end of the sleeve 18 (18') to prevent the sleeve 18 (18') from coming out of the bore. The securing portion 22a is formed with slits 24 arranged equidistantly along the circumference of the securing portion 22a. The material of the holding ring 22 may be selected from austenitic stainless steel sheet, ferritic stainless steel sheet or ZAM steel sheet other than cold rolled steel sheet.

The electric linear actuator can be applied to electric linear actuators used in an electric motor for general industries and driving sections of an automobile etc. The ball screw mechanism converts the rotational input from an electric motor to the linear motion of a drive shaft.

The present disclosure has been described with reference to the preferred embodiment. Obviously, modifications and alternations will occur to those of ordinary skill in the art upon reading and understanding of the preceding detailed description. It is intended that the present disclosure be construed to include all such alternations and modifications insofar as they come within the scope of the appended claims or their equivalents.

What is claimed is:

1. An electric linear actuator comprising:
a housing;
an electric motor mounted on the housing;
a speed reduction mechanism for reducing rotational speed of the electric motor, via a motor shaft;
a ball screw mechanism for converting rotational motion of the electric motor, transmitted via the speed reduction mechanism, to axial linear motion of a drive shaft, the ball screw mechanism comprising a nut and a screw shaft, the nut including a helical screw groove on its inner circumference, the nut is rotationally supported by bearings mounted on the housing but is axially immovable with respect to the housing, the screw shaft is coaxially integrated with the drive shaft, the screw shaft includes a helical screw groove on its outer circumference corresponding to the helical screw groove of the nut, the screw shaft is inserted into the nut, via balls, the screw shaft is axially movably supported on the housing but is non-rotatable with respect to the housing;
a blind bore is formed on the housing to contain an end of the screw shaft; and
an anti-rotation mechanism for the screw shaft comprises a sleeve and a guide pin, the sleeve is press-formed from steel sheet and has a continuously substantially cylindrical shape and is fit in the blind bore of the housing, the guide pin is mounted on the end of the screw shaft, via an aperture formed in the screw shaft and the guide pin axially movably engages with the sleeve but is non-rotatable with respect to the sleeve.

2. The electric linear actuator of claim 1, further comprising protruding ridges on the inner circumference of the blind bore of the housing and the sleeve of the anti-rotation mechanism engages the protruding ridges.

3. The electric linear actuator of claim 2, wherein the sleeve is formed with axially extending recessed grooves arranged equidistantly along its periphery in a petaloid fashion, in cross-section.

4. The electric linear actuator of claim 1, wherein the sleeve is formed from stainless steel sheet.

5. The electric linear actuator of claim 1, wherein the sleeve is formed from cold rolled steel sheet and surfaces of the sleeve are liquid phase plated.

6. The electric linear actuator of claim 1, wherein an outer end of the blind aperture is formed with an annular groove, a holding ring is snap-fit into the groove to abut against one end of the sleeve to hold the sleeve in the blind aperture.

7. The electric linear actuator of claim 6, wherein the holding ring is press-formed from steel sheet, the holding ring includes a securing portion and a flattened portion, the securing portion has a circular configuration and is snap-fit into the annular groove, the flattened portion extends radially inward from the securing portion, the flattened portion abuts against an end of the sleeve, the securing portion is formed with slits equidistantly arranged along the circumference of the securing portion.

8. The electric linear actuator of claim 6, wherein the holding ring is formed of ZAM steel sheet.

9. The electric linear actuator of claim 1, wherein the through aperture is formed with a predetermined hardened layer by high frequency induction hardening.

10. The electric linear actuator of claim 1, wherein outer peripheral faces of the guide pin are crowned.

11. The electric linear actuator of claim 1, wherein the housing is formed of aluminum alloy.

12. An electric linear actuator comprising:
a housing;
an electric motor mounted on the housing;
a speed reduction mechanism for reducing rotational speed of the electric motor, via a motor shaft;
a ball screw mechanism for converting rotational motion of the electric motor, transmitted via the speed reduction mechanism, to axial linear motion of a drive shaft, the ball screw mechanism comprising a nut and a screw shaft, the nut including a helical screw groove on its inner circumference, the nut is rotationally supported by bearings mounted on the housing but is axially immovable with respect to the housing, the screw shaft is coaxially integrated with the drive shaft, the screw shaft includes a helical screw groove on its outer circumference corresponding to the helical screw groove of the nut, the screw shaft is inserted into the nut, via balls, the screw shaft is axially movably supported on the housing but is non-rotatable with respect to the housing;
a blind bore is formed on the housing to contain an end of the screw shaft; and
an anti-rotation mechanism for the screw shaft comprises a sleeve and a guide pin, the sleeve is press-formed from steel sheet and has a continuously substantially cylindrical shape and is fit in the blind bore of the housing, a ring engaging the housing and the anti-rotation mechanism locking the anti-rotation mechanism on the housing, the guide pin is mounted on the end of the screw shaft, via an aperture formed in the screw shaft and the guide pin axially movably engages with the sleeve but is non-rotatable with respect to the sleeve.

* * * * *